Nov. 27, 1951   W. M. MARSH   2,576,258
DUAL WHEEL ASSEMBLY
Filed Dec. 26, 1946   2 SHEETS—SHEET 1

William M. Marsh
INVENTOR.
BY Percy Tate Griffith
ATTORNEY

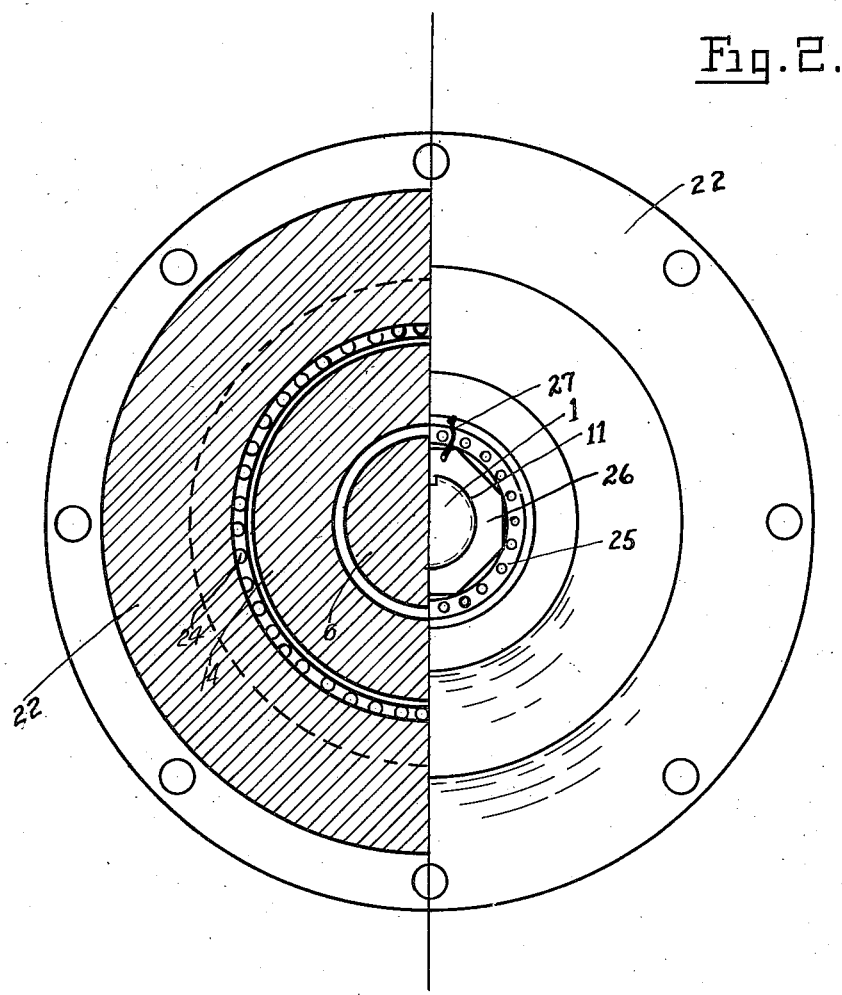

Patented Nov. 27, 1951

2,576,258

UNITED STATES PATENT OFFICE 2,576,258

DUAL WHEEL ASSEMBLY

Willis M. Marsh, Sarasota, Fla.

Application December 26, 1946, Serial No. 718,377

12 Claims. (Cl. 301—36)

1

This invention relates to dual assemblies for the wheels of motor vehicles of all kinds including trucks, and load-trailers towed thereby.

It has especial reference to the front wheels of such trucks and other vehicles, and is more particularly intended to solve serious problems and difficulties now occasioning much peril and daily risk of disastrous accidents in the transportation units of working trucks, large passenger busses, vans, and load-carrying trailers from four to forty tons of freight.

In the steering of such heavily laden vehicles, and the mere turning of them from side to side of the road in transit, the turning of corners and swinging, whether by dint of direct manual handling or, in the case e. g. of load-trailers, by the mere towing and following the path and pull of the leading or traction vehicle, it will be noticed that the difficulty and dangers of breakdown or tire-bursting or tearing off or throw-off of steering thereof, are proportional to total truck-weight and load-weight. Where two tires are mounted upon one wheel or axle, a study of action on turn shows frequently that one tire is turning more freely than the other, that one may be skidding or sliding or "burning" in frictional contact with the roadway; and even the rear dual wheels or dual tires employed will likewise noticeably exhibit similar traits and performance. All of which has occasioned concern, has been causative of numerous accidents, is fraught with constant perils and has resulted in some attempts to meet the problems presented, but so far as I am aware, nothing adequate to the serious nature of the situation has thus far been devised which in a practical, efficient and thorough manner presents an adaptable workable, dependable solution to such problems, certainly not in a manner to accord concomitantly with all the manufacturing and operative requirements of the industry.

The primary object of my invention is the accomplishment of safety; the provision of means for avoiding such perils and such accidents by measurably, and to a major extent preventing them; the provision also of means whereby, when such accidents do occur, the immediate and now inevitable consequences thereof may be averted or minimized in large degree.

More specifically, the objects of the invention are: first, to provide such a wheel assembly which may successfully be installed and employed for a long duration of safety-service upon the front wheels of such heavily-loaded and other vehicles to better support the loads of truck and

2 freight, to avoid break-down by its use as an adequate load-carrier, weight-sustainer, and distributor; second, by taking off the front wheels the present terrific strains exceeding what they can properly carry under the very backward and insufficient front wheel assemblies now provided; third, to prevent almost certain casualties due to difficult and under some conditions, impossible steering and turning tasks which the hands and skill and strength and alertness of one man may not be able to meet and handle; fourth, to render steering in general and making daily routine service more easy, efficient, less fraught with worry and strain upon both driver and dispatcher and responsible owner in his central office; fifth, to actually prevent the complete upset, overturn, wild swerving off the roadway, of the truck if a front tire bursts, blows out, or punctures or is torn or thrown off its rim; sixth, to minimize the consequences, in the event that either tire of the dual front assembly fails, and enable the vehicle to proceed under braking-control to a slowly effected safe stop, or even continue upon the unaffected tires upon the same roadway to a near destination or port of tire repair.

With these and other objects in view, my invention consists in an entirely novel and original construction of such dual wheel assembly, in which I first reconstruct the main spindle to comprise three separate bearing-tracks at different positions and preferably in gradually reduced diameters from inner to outer end of said spindle, at such points of such location upon said spindle relatively that both the inner and outer wheels shall have a bearing upon said spindle directly; secondly, provide an inner wheel which comprises in its structure a combined revoluble hub portion solely for the said inner wheel every portion of which revoluble hub portion is in direct antifrictional contact with said main spindle, with its bearings thereon, and which inner wheel and its hub portion also is formed with an integral tubular super spindle having a double functional character in providing an extended hub portion for the said inner wheel, in direct anti-frictional contact with the said main spindle (that is, as a simple additional hub portion itself constituting a further support and stress distributor of the said inner wheel), and as a provision of a superspindle lying directly upon the said main spindle, and serving as a support for the hub of the outer wheel, each inch and millimetre of the said integral hub and super-spindle thus being in direct anti-frictional contact with and supported by the said main spindle of the assembly, and having its bearings wholly and solely directly upon the said main spindle and upon nothing else, and the said bearings of the said integral combined hub and super spindle revolving upon two of the bearing-tracks of the said main spindle, the innermost of the said bearings and bearing-tracks being at the extreme inner end of said main spindle and the outermost bearings and bearing-tracks being at a point immediately below the outer end of the integral combined hub and super-spindle, and the said main spindle immediately adjacent said outermost bearing and bearing-tracks being threaded, and provided thereon with means for securing the said combined hub and super spindle in place upon said main spindle; and third, an outer wheel which comprises in its construction a wide-bore hub mounted upon the super spindle portion of the said integral hub-spindle and having its anti-frictional bearings at its innermost end upon said super spindle, while its outermost anti-frictional bearings are directly upon and in contact with the third bearing-track of the main spindle located just beyond the screw-threaded portion of said main spindle and said spindle being formed with separate securing means for said wide-bore hub of the outer wheel at and upon the outer end of the said main spindle, and said outer wheel-hub also abutting against the preferably median portion of the combined inner wheel hub and super-spindle, leaving room for adjustment of the inner wheel hub and super spindle longitudinally of the main spindle, room for grease, and for the securing means thereof, and where such be desired, as customarily it would, and also the structure enables both the separate securing means to fasten the inner wheel-hub and super spindle in place upon said main spindle, and the outer wheel-hub securing means additionally to fasten said inner-wheel hub and super spindle when said outer wheel-hub is attached.

My said invention further, in a more defining and specifically descriptive sense consists of the following elements or factors combined to create what I now deem the preferred form of the invention applicable to trucks and the other similar vehicles to which it is at present usably-designed, as such vehicles exist today, to wit: a dual wheel assembly consisting first, of an axle end or spindle extended axially and longitudinally as the fundamental element and provided with three separate bearing tracks at different positions thereon, and preferably in gradually reduced diameters from inner to outer end of said spindle; second, an inner wheel composed of an integrally formed revoluble hub and tubular super-spindle mounted upon the major portion or length of said main spindle, carrying upon its main hub section the rim and tire, and interiorly provided with roller bearings upon its two ends, which ride directly on the innermost and the near-median bearing-tracks formed upon the inner end of the spindle and upon the near-outer-end portion of said spindle respectively, and being further provided with an upraised annular flange or shoulder about midway between said bearings; third, a means for independently adjusting, setting and locking this combined hub and tubular super-spindle in such position upon the main spindle as may be desired; fourth, an outer wheel composed of a wide-bore hub, carrying the outer rim, and tire, mounted upon, and surrounding the said tubular super-spindle-hub as stated, throughout all of the area of said super-spindle-hub which it encompasses, and provided with roller-bearings interiorly at its inner edge where it abuts against the medial shoulder upon the main hub, and also at the outer end of said wide-bore hub, hub-cap and grease-cup, this last roller-bearing being mounted directly on the outermost bearing-tracks, which are located upon the outer end portion of the main spindle and revoluble thereon, and supported thus by both the spindle directly and by the super-spindle-hub and through it, upon the said main spindle as well as the median portion of the said super-spindle-hub; fifth, a separate means for adjusting, setting and locking the said outer wheel-hub directly upon the main spindle to be independently adjustable and removable; whereby each wheel, inner and outer, is independently revoluble, the inner being supported directly by the main spindle, and being also journaled upon or against the roller bearings inside the outer hub where it joins the hub shoulder at the median line of the main hub, while the outer wheel is revoluble upon the main hub and also upon the spindle-end-portion the structure being such that there is room between the super-spindle end bearings lying directly upon the bearing-tracks beneath the same, and the outermost bearing-tracks of said main spindle and the bearings of the outer wide-bore wheel hub which ride thereon, to permit an adequate measure of longitudinal adjustment or tightening upon the main spindle of the securing means for said combined hub and super-spindle, as well as such separate securing means upon the extreme outermost end of the main spindle for the outer wheel-hub to enable said securing means to additionally fasten and hold the inner wheel hub and super spindle in its place, and whereby the blow-out of either tire will leave the other effective.

In the accompanying drawings forming part of this specification in which there is delineated a right front end spindle of a truck, made according to my invention, and provided with the elements thereof mounted upon and including said spindle, to comprise a front dual wheel assembly; and in which like numerals of reference designate like parts in the several views:

Figure 2 is in its left half, a transverse vertical section taken on the line 2—2 of Figure 1 and in its right half is an end elevation of the device shown in Figure 1, the tire-portions not being shown.

Figure 1:
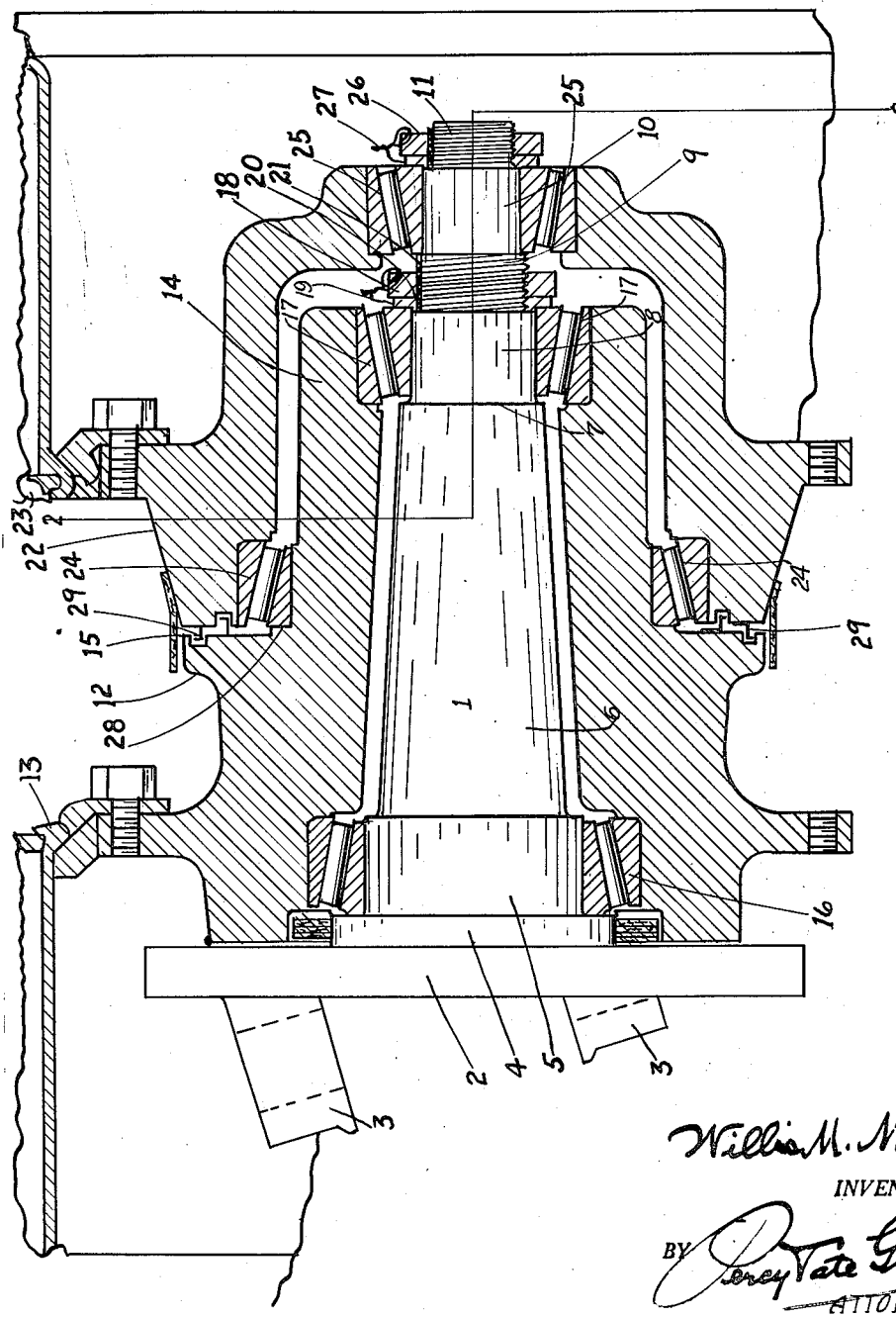
Figure 1 is a vertical central longitudinal section of the invention, with the spindle and certain other inner and appropriate details shown in simple elevation unsectioned.

In constructing such a front dual wheel assembly as made the exemplary subject of this illustration and description, I provide the truck, trailer, van, bus, or other transportation or working vehicle, or traveling mechanism, or wheeled machinery or appliance, with a spindle 1, made as usual or in any approved or improved manner, but axially or longitudinally elongated, which is mounted in place in any suitable way, in any suitable connection method with the axle of the vehicle, not shown, since such connection forms no part of the invention. This spindle is fashioned in an expressly distinct form in the embodiment shown herein as a front wheel assembly, and while integrally made, being machined as a whole with all its parts as indicated, it comprises, upon its longitudinally extended shaft, which is approximately frusto-conical or tapered in shape, first, upon its wide or thick innermost end a comparatively large circular back-plate 2, which carries the yoke arms 3, 3, forming part of the steering knuckle, not shown; next, a smaller disk or annular shoulder 4, narrower or thinner than the back-plate as well as of much lesser diameter; then a wide and reduced annular shoulder or bearing-track 5, which drops very slightly at its outer edge to the main tapered shank 6 of the spindle which, near about the last third of the spindle-length, is again slightly reduced to form a shoulder 7, followed by another wide bearing-track 8, after which the spindle is threaded at 9, followed by a third bearing-track 10, and then finally the extreme outer end of the spindle is again threaded at 11. It is understood, therefore, that as before indicated, all the foregoing parts of the spindle and back-plate combination are machined in one piece and at one manufacturing operation.

Upon the inner end of the spindle is mounted the inner wheel hub 12, which carries the inner tire 13 partly shown. This inner wheel hub comprises a hub portion and an integral super spindle 14. The super spindle is hollow or tubular like the hub to which it is attached and much reduced in outer circumference. At the median line of the combined main inner hub and super spindle is formed an annular shoulder 15. Upon the inner end of the main fundamental spindle 1, and upon its outer bearing track 8, are mounted roller bearings 16 and 17 respectively which carry the said combined main inner hub and super spindle.

It will be noted from an examination of Figure 1 of the drawing, and from this description of the apparatus so far, that this single integrally formed element, my combined inner wheel hub and super spindle, has two points of support, and that both of them are directly upon the main or fundamental spindle 1 of the assembly, which is a single solid, integral element, itself; that this hub-super spindle has its bearings solely at each end of said hub-spindle, upon the bearing-tracks 5 and 8, formed upon said main spindle 1; that its sole supporting points are directly upon main spindle 1 at the inner end of said main spindle (bearing-track 5), and upon the outer portion of the main spindle covered by the said hub-spindle 12 and 14 (upon bearing-track 8); that there is no intervening, subordinate, alien, separate, element interposed between the said inner hub and the solid main spindle, nor between the said super spindle and the solid main spindle; that these two sole points of support and contact are bearings riding on smooth, machined, solid integral portions formed upon the said main spindle, and the rest of the combined element 12, 14 which lies between said bearings 16 and 17 is only in contact anti-frictionally with said main spindle and with nothing else in the entire assembly, without any friction-contributing interposed factor, and without any weakness-contributing interposed factor; that there is no break in continuity or solidity of either the element 12, 14, or the spindle element 1; that the said element 12, 14 does not lie one-half on a relatively strong, and the other one-half on a distinctly broken unsupporting factor.

Also that the sole revoluble surface or area of the said main spindle 1, on which anything whatever revolves, is comprised of three smooth distinct separate bearing-tracks 5, 8 and 10, on which, as shown in the said Figure 1, and as so far described and as will further hereafter be described, only the anti-frictional bearing 16, 17 and 25 ride or contact.

Upon the threaded end 9 of the main spindle 1 is mounted an adjusting nut 18 provided with an intervening washer 19 which is formed with a depending lug 20 running in groove 21 in the threaded end 9 of said shaft. This arrangement provides a lock washer for the said adjusting nut, without requiring any cotter-pin or equivalent, penetrating the spindle 1, which would be detrimental. Any customary locking means for said nut may be used, such as a safety wire 27.

Upon the super spindle portion of the combined inner hub and super spindle, I mount the outer wheel hub 22 which carries the outer tire 23, only partly shown. This outer wheel hub 22 is mounted upon a special roller bearing 24 set upon the exterior of the combined inner hub and super spindle at the median line thereof and is also mounted upon a roller bearing 25 set upon the outermost bearing track 10 formed upon the extreme end of the main spindle 1; said outer hub thus being supported upon the supper spindle and directly upon the said main spindle 1. Said hub also provides a closure for the whole mechanism as well as a grease cup. It is secured in properly adjusted position by an adjusting nut 26 through which or through the spindle alone is inserted a safety wire 27.

It will now be seen that the apparatus of my newly invented dual wheel assembly herein disclosed, is a strong, sturdy mechanism of few parts, embracing nothing other than the active, operative, efficient elements which combine to constitute a definite structure organized to perform the functions which it is designed to perform, and accomplish the objects which I have set out to accomplish. It consists in effect of a powerful main spindle redesigned to receive certain new elements and factors in direct contact with the redesigned parts of the said spindle, one which is wholly new and original with my invention, and nowhere existent prior thereto, comprising, mounted upon its back-plate 2, having annular shoulder 4, of a ribbon-like peripheral bearing-track 5, a reduced and preferably slantedly diminishing elongated body portion, dropping to a second bearing-track 8, similar to the track 5, beyond which the spindle is threaded then formed with a third bearing-track 10, whereafter it is threaded; next, of the inner wheel hub and combined super spindle, all mounted on said bearing-tracks, and having bearings at each end riding on said bearing-tracks and forming initially an extended directly supported hub in contact with the main spindle through said bearings and tracks, forming a wide area of such contact and support for the inner wheel, and concomitantly forming a super spindle for the outer hub, enabling it to ride upon said inner wheel hub and super spindle at its extended end, but enabling it also to be separately secured directly upon the main spindle as an inner wheel hub primarily, independently of anything and all else it may do to serve as a journal for the second wheel; lastly the outer wheel hub, which is uniquely mounted upon a super spindle not only itself a revoluble element, directly revolving upon the main spindle without intervention or superposition of an additional element therebetween, but also a super spindle which is already secured upon said main spindle by its adjustment-tightening and fastening means and has thus become a firm and strengthened support and journal of increased strength and safety for such outer wheel to revolve upon; and finally, an outer wide-bore wheel hub riding on the super spindle in bearings where the hub drops down in diameter to the super spindle, and also at its outer end rides on the outermost bearing tracks 10, which are formed upon the main spindle quite at the end of said spindle, midway between the first threaded portion 9 and the second threaded portion 11. The extent of the threaded portion 9 longitudinally of the main spindle constitutes a determining index of the distance between the two bearing tracks 8 and 10; and the length of the outer hub, its position on the track 10, and its abutment at its open or inner end against the annular shoulder 15, determine the amount of space left between the end of the super spindle and the inside of the outer hub 22. It is a necessity of the proper structure of my invention, that attention be paid carefully to the shown and described construction hereinabove outlined, to get all the results of this preferred embodiment, and attain all the objects and purposes designed to be attained thereby, and enable it to operate in the manner shortly to be described hereunder. For example, my invention does not comprise a spindle centrally broken or formed in pieces, without adequate attention to mechanical stresses or with some meager attempt to meet the need to brace the weakened member; but comprises a strong sturdy spindle especially designed to stand the loads and strains. Nor does it comprise interposed additional factors lending weakness otherwise, or vital parts operating indirectly instead of being supported directly on the powerful hub and super spindle of my invention formed in the manner shown, supported on said spindle in the manner shown, attached securely in the manner shown, independently and, doubly.

Examining Figure 1 closely, it is seen that each of the wheels is positioned directly above the point of its support, the inner one being right over the bearing 16, and that as the weight of the outer wheel lies on the bearing 17, this weight tends to balance the inner-wheel weight, which lies over the bearing 16 as stated. In addition, the separate adjustment of the securing means which fastens the said inner wheel hub and super spindle, means that there is a firmness and balance about the seating of the combined member 12, 14 upon the main spindle, with absence of any wobbling or unstable tendency; there is a compactness of structure, of mutual adaptability, of form and assembly. The skilled eye, tuned to this art, will detect this. Never in this class of device, have three main separate elements been more formed for one another, closely functioning with one another, due to the features hereinabove pointed out as necessary to combine as thus shown and here urged to be scrupulously followed. The directness of situation upon the spindle, the integrality and solidity of that spindle, are important.

It is also highly important that the double threading of the main spindle, with its resultant independent securing of the inner wheel separately from the outer, and further double securing of the inner wheel by two cumulative fastening means, be recognized. With my invention, it is almost impossible that the inner wheel should even attempt to come off, though the outer be torn off or flung off both spindle and highway. There is likewise enough space between the super spindle end and the cap of the outer hub, to allow for taking up wear, slack, loosening, or other measure or matter of adjustment.

The seating of the outer hub first upon the superspindle through the bearings 24 at the median line of element 12, 14, and oppositely in the bearings 25 riding upon the bearing-track 10, means that while the outer hub is revoluble upon the inner hub and super spindle, it is so only upon its inner end, and the outer end is seated directly upon the outermost end of the main spindle, through its bearings 25 riding upon the track 10. Thus each of the two wheels, each of their hubs, has direct support and bearing upon the main spindle; of the four bearings, 16, 17, 24 and 25, three of them are positioned and revoluble on and in contact with, the bare main spindle directly, and the fourth is directly upon the centre of the combined inner wheel hub and super spindle, itself directly mounted on that main spindle.

At the median line where said outer hub is juxtaposed, a small annular shoulder 28 prevents frictional contact with the inner hub portion of the inner wheel. At this junction I place an annular baffle device 29 designed to prevent the entrance of dirt, grit and water.

Minor details of the inner and outer wheel portions and tires and the bolts attaching them are shown in the drawing in Figure 1, but as the exact form of the same constitute no part of my invention and they are fully understood by all skilled in this art, I make no description thereof. Roller bearings may be added to those shown, if desired, and also other forms of bearings, such as ball bearings, may be used.

The operation of my newly invented dual wheel assembly will, from the foregoing description taken in conjunction with the drawings, be obvious. I provide such an assembly particularly adapted for the front wheels, in which the inner wheel is mounted directly in roller bearings upon the main spindle 1 and the outer wheel is mounted in roller bearings, the innermost of which rotate upon the super spindle portion of the main inner hub and also directly upon the outermost end of the main spindle 1. The two wheels are independently revoluble. They are independently fastened in place. The outer hub has a doubly anti-frictional mounting in that its median roller bearing rides upon the tubular super spindle which is itself running simultaneously revoluble beneath it. The said outer hub is also doubly mounted, upon the said tubular spindle and thus indirectly upon the main spindle 1, and concomitantly is mounted at its outer end directly in bearings riding the said main spindle 1.

There are no extra supernumerary parts or elements in my invention. There are no pieced spindles requiring any additional parts as a futile attempt to brace or support weakened parts of the structure, since there are no such weakened parts. There are no elements or factors of the device so poorly supported on too little strength of structure or mechanical principles to call for such extra parts. In making this invention, with strength and safety of the wheels, of the truck or other vehicle, the driver and passengers if any, in mind, I devised the separate elements, their form and relations, the part and function each performs, in such mutually right proportion to the whole, in such compact, simple and direct shape, assembly and totality as shown and herein described, with all the stresses and strains on each and on all together, that the device will do what I planned it to do, as much by such simplicity and directness as by anything else. There is no connection between the inner hub and the outer hub inhibiting the revolution of either by the other or by any intervening mechanism. The outer wheel may readily be removed without in any way disturbing the inner wheel; either to make repairs or for purpose of adjustment. From time to time the adjustment of either wheel may be easily effected.

I believe that those skilled in the art will also perceive in this newly invented dual wheel assembly, a solution of the problems presented to which I have referred in the preamble to this specification and particularly to the especial problem of a front dual wheel assembly. All of the objectives herein before indicated are, I believe, fully accomplished by this provision, first, of an axle end or main fundamental spindle extended axially and longitudinally as the primary element; second, an inner wheel element composed of an integrally formed revoluble hub and tubular super spindle mounted upon the major portion or length of said main spindle 1 and carrying upon its main hub section the inner rim and tire and interiorly provided with roller bearings upon its two ends, which ride upon the inner end of the spindle 1 and upon the outer end portion thereof respectively, and being further provided with an upraised annular flange or shoulder about midway between said bearings; third, a means for independently adjusting, setting and locking this combined hub and tubular super spindle in desired position; fourth, an outer wheel composed of a wide-bore hub carrying the outer rim and tire mounted upon and surrounding the said tubular super spindle hub as stated throughout all of the area thereof which it encompasses, and provided with roller bearings where it abuts against the median shoulder of said main hub and also upon the outer end of the said wide-bore hub directly upon the main spindle and supported thus both directly and indirectly upon said spindle with independent locking means.

I am aware that one Ash invented a device for a dual wheel assembly intended to cover a drive on one wheel and brake on another, patented in 1934, No. 1,979,598, in which a spindle wholly unlike my especially invented one, was surrounded by a tubular casing and bearing on which was mounted the hub of the inner wheel extended down from a drum, located near the rim, with the last bearing of the inner wheel set short, riding not on my special main spindle but on his tubular casing, his outer wheel hub lapping the inner one and having its outermost bearing for that outer wheel on his casing about where I place my last bearing for my inner one on my special main spindle, and I know nothing of how he planned to fasten his two wheels on, he hasn't the slightest shadow of my system. Also that one Kendall in 1937 patented a braking system for dual wheels of a different sort, #2,082,292, side-by-side wheels, not wheel-on-wheel, with screw rings at middle of his shaft, the whole thing utterly alien to my invention, and not containing anything I claim. Also that one Burger took out a patent in Germany in 1929, #510,663, containing a short inner hub, on which the inner wheel was mounted and then the outer, but I do not know whether he even claimed he invented a super spindle or if anyone alleges anyone did so before me; Burger too, has his inner wheel bearings well back, and his last outer bearing about where I place my last inner, with apparently no means of securing this inner hub and wheel separately in its and their position, apart from blocking it in with the outer hub, and with utter disregard of any adjustment of its position independently on the spindle, as is the truth I believe with all these three attempts of Ash, Kendall and Burger at producing a dual wheel assembly, with I judge insufficient conception of the intricate problems involved which my invention so completely solves as very fully and very completely described herein, nor do I find that even adequate provision was made or tried or knowingly confronted by any of them in facing that one wheel loose and another tight was one of those problems, without solving which wobbling, dangerous action in travel, failure of synchronization of functioning, and other perils to life and impossibility of adoption by automobile truck and van manufacturers, were inevitable, as all skilled in this art would no doubt agree. I do not know if any of these was made and tried.

I do not use their contrivances nor they mine. I expressly disclaim them each and all. I make no claims which would prevent anyone and everyone from making their devices, if anyone should. Not one of them has my spindle, made as described herein so fully that it would be repetition to do so here. Without that spindle no device in structure like mine, can be constructed. Without it, no device could be made to operate like mine does. They have not one of them, my long super spindle that rests directly on the inner end of a solid continuous main spindle and almost on the outer end of the same said spindle. They have no double screw-threaded end of a main spindle with two smooth bearing tracks intervening the same, on which tracks are respectively set the bearings of the super spindle and the closely adjacent bearings of the outer end hub-cap disk of the outer wheel. They have no attachment means incorporating separate means within and without the hub cap for examining, adjusting, securing the two wheels separately from and at the end. They have no arrangement in any way like my system of independent fastenings at the outer end of the spindle, apart from my special safety devices and shown structure which can be so checked and tightened or loosened. They have no combined outer hub with integral hubcap and grease cup with bearings in it for riding with its main outer hub part on the super-spindle and its hub-cap portion provided with its own roller-bearings which ride on the special bearing track which is provided for them in between the two screw-threaded portions of the main solid continuous spindle. They have no arrangement of two contiguous attachment means accessible at the outermost end of the spindle, one inside the hub cap to inspect, adjust, secure the inner wheel on the super spindle, and the other on the outside of the hub cap right next to it to separately and independently do the same for the outer wheel, hub and cap. They none of them have combined outer hub, hub-cap and grease cup at all, which not only gives any needed lubrication to spindle, super spindle, three roller bearings, but also keeps the inside adjusting mechanism of the inner wheel and super spindle always ready for easy adjustment, with a space enough for grease to supply enough for the outside attachments of the outer wheel, ready at hand to take out a bit of grease for that, whenever the inside adjustments are inspected. I do not claim that every last detail of what my invention is and what it will do, and what the previous attempts are not and cannot do, is of itself independently patentable per se, but I do claim that only by the use of my own novel, useful and patentable plan, system and construction and combination and arrangement of parts set out in my appended claims, is it possible to accomplish all the major and minor results and achievements herein indicated, and that no prior device ever did so.

Having thus fully described my invention, what I claim as new and desire to secure by Letters Patent is:

1. A dual wheel assembly comprising in its construction a main spindle, a combined inner wheel hub and tubular super spindle revolubly mounted directly upon said spindle in bearings in contact therewith and wholly supported upon said main spindle without the interposition of intervening structure or elements, and carrying the inner wheel upon its said inner hub portion, and an outer wheel hub mounted at its inner end upon the said super spindle, and mounted at its outer end upon said main spindle, and thus revoluble upon said super spindle and also directly upon said main spindle and carrying the outer wheel; the said combined inner hub and super spindle and the outer hub, each being revoluble independently of the other; the structure, and the mounting of the outer wheel hub upon the super spindle being such that an adequate space is provided there between the end of the super spindle and the inner face of the outer wheel hub for a securing device directed to the said inner wheel hub and super spindle, and for adjusting said securing device, and means within said space adapted to be adjusted and tightened upon the said main spindle independently of the securing means of the outer wheel, and operable separately therefrom when said outer wheel is removed, and remote from such outer-wheel securing means; and adapted to permit the removal of the outer wheel and access to the securing means of the inner wheel to tighten the same, or to remove the said inner wheel; and adapted to be adjusted upon the said main spindle against the outer end of the said super spindle to simultaneously tighten and secure said super spindle; and the outer wheel hub being provided with an exterior securing means separate and independent from the inner-wheel securing means, and adapted to be adjusted and tightened to fasten the said outer wheel hub on, and also prevent the inner wheel hub and super spindle from coming off if the securing means of said inner wheel hub should slip or fail for any reason.

2. A dual wheel assembly comprising in its construction a main spindle adequately elongated axially and formed with three separate and distinct smooth bearing tracks for roller bearings upon its inner end and near its outer end and again at its outermost end, said main spindle being continuous, integral, of adequate length and strength to receive directly thereon two elements, one an inner wheel hub and super spindle, and the other an outer wheel hub, without the interposition or addition of any auxiliary element located upon the main spindle; a combined inner wheel hub and tubular super spindle mounted in roller bearings directly upon said main spindle, which roller bearings ride upon the inner bearing track and the track near the outer end, the said super spindle portion being of reduced exterior diameter and provided with a roller bearing track thereon adjacent to the median line of the combined element; an outer hub of adequately wide bore mounted upon said tubular spindle and provided with roller bearings which respectively ride upon the exterior bearing track of the super spindle at the median line and upon the outermost bearing track of the main spindle in such position and relation that ample space is left bare and free on said main spindle between the said super spindle as it lies directly upon said main spindle, and the outermost part or cap portion of the outer wheel hub, to receive therein a securing means for the inner wheel hub and super spindle, and for adjusting and tightening the same upon said bare and free surface of the main spindle, longitudinally of the same; and securing means within said space, operating longitudinally on said main spindle, adapted to be adjusted and tightened upon the same, independently of the outer wheel securing means, to secure said inner wheel hub and super spindle, and bearing against the end of the said super spindle, to adjust and tighten the same, or remove it, and its hub and operable separately when the outer wheel hub is removed; and the outer wheel hub being provided with an exterior securing means, separate and independent from the inner wheel securing means, and adapted to be adjusted and tightened to fasten the outer wheel hub on, and also further tend to help hold the inner wheel hub and super spindle in position in cases of emergencies.

3. A dual wheel assembly comprising in its construction a main spindle formed continuously and integrally, and of a length and strength to carry the inner and the outer wheels of the vehicle without auxiliary support to said main spindle, and formed with a bearing track at its innermost end, on its outer end a shoulder followed by a second bearing track, the spindle being threaded beyond said second track, and formed with a third bearing track just beyond this, and with a further threaded portion at its outermost end, a combined inner wheel hub and tubular super spindle of reduced exterior diameter, both mounted in roller bearings directly upon said spindle at its inner end and near its outermost end upon said first and second bearing tracks; an outer wide bore hub mounted in roller bearings respectively upon the exterior of the super spindle at its junction with the inner hub portion and upon the outermost end of the main spindle; both elements being independently revoluble in the assembly, the inner wheel hub being thus revoluble upon the main spindle, and the outer wheel hub being revoluble both upon the super spindle and the main spindle; the main spindle being provided with an adjusting nut upon said main spindle to secure the inner wheel hub and super spindle revolubly in place and said main spindle being provided with a separate and independent adjustable nut upon its outermost threaded portion to secure the outer wheel hub in revoluble position upon the super spindle and upon said main spindle; the structure being such that the threaded part of the main spindle between the second and third, bearing tracks holds adequate space to allow for adjusting, and regulating the adjusting nut to take up slack or wear from time to time to hold the end of the super spindle firmly independently of the exterior adjusting nut and remote therefrom.

4. A dual wheel assembly comprising in its construction a main spindle formed continuously and integrally, adapted and constructed to carry the two wheels without any auxiliary element interposed between said main spindle and the hubs and hub extensions on which said wheels are mounted, said spindle being further formed with three separate bearing tracks, one at its inner end, one near it outer end, and one on its outermost end, a combined inner wheel hub and tubular super spindle revolubly mounted thereon and carrying the inner wheel upon its said inner hub portion, and an outer wheel hub mounted at its inner end upon the said super spindle, and mounted at its outer end upon said main spindle, and thus revoluble upon said super spindle and also directly upon said main spindle and carrying the outer wheel; the said combined inner hub and super spindle and the outer hub, each being revoluble independently of the other; the element of the combined inner wheel hub and super spindle being formed with a shoulder near its median line from which shoulder the super spindle is reduced in exterior diameter, baffle means interposed between the inner wheel hub portion and the outer wheel hub; the main spindle being formed with a screw threaded portion near its outer end and outwardly of the said super spindle thereon and provided with an adjusting nut to secure said inner wheel hub and super spindle element revolubly in position upon said main spindle; and the said main spindle being further formed at its outermost end with a screw threaded portion and a separate adjusting nut for independently adjusting the outer wheel hub in revoluble position upon the said super spindle and upon the main spindle whereby the outer wheel may be removed without disturbing the inner wheel for replacement, repair or for adjustment of the outer or both wheels; the structure being such that the inside securing means of the inner wheel hub bears against the end of the super spindle, with room for axial adjustment to tighten said means, to hold the hub-spindle firmly in place as a support for the outer wheel, which is held on the said super spindle and directly upon the main spindle end in its bearings upon the outermost bearing track thereof, and said outer wheel hub being held in place an adequate distance from the inside inner hub-spindle to permit regulation of said inner securing means.

5. A dual wheel assembly comprising the combination of a main spindle formed continuously and integrally, without break, knuckle, or interruption, of a length and strength to carry both the inner and the outer wheels of the vehicle, and formed at its inner end with an annular plate with an adjacent annular bearing track narrower in diameter than said annular plate, and higher than the remainder of the said main spindle, which is reduced therefrom outwardly, said main spindle having a smooth bare free surface for the major part of its length, and near the outer end thereof an annular shoulder formed by a further reduction in diameter of the spindle, on which further reduction is a second bearing track, and outwardly beyond the same the spindle is screw-threaded and immediately beyond that is provided with a further reduced portion forming a third bearing track, and also an outermost screw-threaded portion at the extreme outer end of the said main spindle; a combined inner wheel hub and super spindle mounted directly upon said main spindle, having its inner bearings riding on the innermost bearing track of the said main spindle, close to the annular plate thereof and covering directly the bare free surface of the said spindle, and having its outermost bearings riding on the second bearing track of said main spindle, close to the annular shoulder on said spindle, with no elements or auxiliary parts interposed between said inner wheel hub and super spindle, and the said main spindle, and the said inner wheel hub having an annular shoulder at about its median line; a wide bore outer wheel hub mounted upon both the super spindle and upon the main spindle through bearings which ride directly upon the super spindle at its median line and bear against said shoulder thereat, and ride directly upon the outermost end of the main spindle through bearings contacting the third or outermost bearing-track of said main spindle, the structure of said outer hub and of the whole assembly being such that there is left an adequate space between the end of the super spindle and the wall or cap portion of the outer wheel hub for the location therein of an adjusting and tightening device upon the adjacent screw-thread between the said super spindle and the third bearing track; a securing means mounted upon the main spindle upon said screw threaded portion, and bearing against the end of the said super spindle to fasten the same in place separately and independently of the fastenings of the outer wheel hub, and remote therefrom, and adapted to adjust and regulate the tightness thereof on said main spindle, and take up slack and wear from time to time, and also assure the firmness of the super spindle for its better support of the outer wheel hub thereon; and securing means upon the threaded portion of the main spindle exteriorly of the outer wheel hub to fasten the same in place and also add to the security of the inner wheel hub, the said outer wheel hub being held against the annular shoulder at the median line of the inner hub and super spindle, where the said inner hub drops to form said super spindle.

6. A dual wheel assembly comprising the combination of a main spindle formed continuously and integrally of a length and strength to carry the two wheels of the assembly without the interposition between their hubs and extensions and the said main spindle of any auxiliary element or contrivance being required for the support of the spindle or any of the parts or the operation of the mechanism, formed at its inner end with an annular plate, and a bearing track near the same, a free and bare space for the major portion of the length of the spindle, an annular shoulder and another bearing track beyond which is a screw threaded portion long enough axially of the spindle to afford space for a securing means to operate therein and adjust its motion upon said screw thread, and beyond this screw thread another bearing track, beyond which another short length of space on said spindle to accommodate an independent securing and adjusting means for the outer member of the dual assembly; this plurality of bearing tracks being each and all of the same in a variously spaced series on the straight line of the spindle, and each adapted for direct contact with an element or elements to be revoluble thereon without interposed extraneous elements preventing such contact; a combined inner wheel hub and super spindle mounted upon the said main spindle in direct contact with the same, and of a bore to closely fit the said spindle with merely space for roller bearings between them, and of a length to extend from the annular plate and the first bearing track to and including the second bearing track, and having bearings riding upon each of the said bearing tracks respectively, the said inner hub portion being located above the said bearings and innermost bearing track, and being reduced exteriorly at about the median line of the combined element to form the super spindle portion thereof, and formed with an annular shoulder thereat; an outer wheel hub of wide bore and length to extend from the median line of the hub-spindle to near the outer end of the main spindle, having roller bearings at its inner end riding on approximately the said median line of the inner wheel hub and midway between the two bearings of the said combined inner wheel hub-super spindle and having its outer bearings riding on the outermost bearing track directly on the main spindle, whereby three of the four bearings of the two wheel hubs are directly on the main spindle, and the fourth such bearing is on the super spindle of the inner hub centered on the main spindle approximately and the said outer hub is just above the second bearing; the structure being such that there is adequate space between the end of the super spindle and the cap portion of the outer hub for adjustment and regulation of the super spindle axially, said outer hub being held against the median annular shoulder where its innermost bearings impinge; and an adjusting and regulating securing device mounted upon the inner screw threaded portion and bearing against the end of the super spindle, independent of the securing means of the outer hub and remote therefrom; and an exterior securing means upon the outermost end of the main spindle to fasten the said outer hub separately and also additionally hold the inner wheel hub in place in case of accident to the inside fastenings.

7. A dual wheel assembly which comprises a solid main spindle adequately long for two wheels when mounted upon bearings of which one overlaps the other; which said spindle is provided with bearing tracks directly at its inner end, and also near its outer end, and with its outer end provided with first a short non-tracked non-bearing portion, screw-threaded, second with a single reduced bearing track immediately beyond said screw-threaded portion, and lastly with an outermost screw-threaded portion immediately beyond said last bearing track; a long super spindle mounted at its two inside and outermost ends, directly on said two first bearing-tracks and carrying the inner wheel; adjusting and attaching means mounted upon the first screw-threaded portion of the spindle-end, being slipped on over the last outermost bearing track and said adjusting means being adapted to bear directly against the last roller bearing and outermost end of the super spindle; and a combined outer wheel hub, hub-cap and grease cup mounted upon the super-spindle in bearings at the median line of said super spindle, midway between the two inner bearings and the outer bearings of said super spindle; the outermost bearings of said combined outer hub and hub cap being located in the disk of said hub-cap and riding on the last bearing track of the main spindle beyond the first screw-threaded portion of the main spindle, and within the screw-threaded outer end of said spindle; and independent adjusting and attaching means for the outer wheel hub directly on the main spindle at its outermost end, outside the said wheel hub and hub cap and grease cup.

8. A dual wheel assembly which comprises a solid main spindle provided with three bearing tracks, one at the inside end, one quite near the outside end, of said main spindle; a super spindle mounted on both of these bearing tracks, with bearings riding said tracks; the said main spindle being reduced screw-threaded just beyond said near-outside bearing for a material and substantial space allowing for adjustment room for said super spindle; a combined outer wheel hub, hub-cap and grease-cup, mounted upon the super spindle midway between its two bearings, and having bearings riding upon said super spindle there, and riding the outermost bearing track at the end of the main spindle, just beyond the said screw-threaded portion; said combined outer hub element having bearings at both ends, at inner end, and one in the hub cap end; the main spindle having a second screw threaded portion at its extreme end further reduced; and two separate independent adjusting and securing means both at or close to the extreme end of the main spindle, the inner one running on the screw part just beyond the super spindle and itself abutting the final bearing of the said super spindle, and the other on the outside threads, abutting the final bearing sunk in the combination hub cap.

9. In a dual wheel assembly, a solid integral elongated main spindle formed with two bearing tracks one at the inner end, and the other quite near the outer end, a reduced screw threaded portion on said spindle just beyond said latter bearing track, forming a non-tracked, non-bearing surface and space for adjustment and attachment means for the inner wheel only, a third bearing track on said main spindle just beyond said threaded portion, and a second reduced threaded portion continuing to the extreme end of the main spindle; in combination with a combined inner wheel hub and super spindle extending throughout the length of the main spindle to ride on both first and second bearing tracks, directly on the main spindle and support the said inner wheel on practically and approximately the whole major part of said main spindle, the said combined hub and super spindle being formed with a bearing track on its exterior midway between the inner and outer ends thereof; an outer hub carrying the outer wheel and provided with bearings mounted therein, riding on the bearing track of the median line of the super spindle and the end bearing track of the main spindle; the said outer hub being an integral combined hub, hub-cap and grease-cup and its outer bearing being inserted centrally in its hub-cap disk; an adjusting means upon the first screw thread portion of the main spindle, abutting against the last bearing of the super spindle, for tightening and securing the same; and an independent adjustment and securing means upon the extreme end of the main spindle outside the outer hub, and abutting against the bearing in the hub-cap.

10. In a dual wheel assembly, the combination with an integral spindle for two wheels overlapping their hubs, said spindle having one bearing at the inside, one near the outside end, both directly on said spindle for an inner wheel, and one at the outside end for an outer wheel, and two screw threaded portions, one between second and third bearings and one at the extreme outer end; of a combined inner wheel hub and super spindle mounted directly on said main spindle on said bearings at the inner and near outer end, a combined outer wheel hub, hub-cap and grease-cup having its inmost bearing on the median line of the super spindle and its outermost in the end disk of its hub-cap; and two independent adjustment and attachment devices on the outer end of the main spindle, one on the inside of the combined outer hub, hub-cap and grease-cup, and the other on the outside thereof, independently controlling the adjustment of the inner wheel and super spindle alone, and the removal, adjustment and securing of the outer wheel while not disturbing the adjustment or securement of the inner.

11. In a dual wheel assembly comprising a main spindle, combined super spindle and inner wheel hub, an outer combined hub cap and wheel hub mounted on the super spindle at the median line thereof; separate and independent inspection, adjustment and attachment means both mounted upon the outermost end of the main spindle, one just inside of the outer hub cap, adapted to fasten and adjust securely the inner wheel hub so that it is unaffected by any loosening or tightening or removal of the outer one, and the other adjusting and securing means being on the outside of the said outer hub cap, and controlling only the said outer wheel without disturbing the inner.

12. In a dual wheel assembly comprising a main spindle, combined inner wheel hub and super spindle, having its inner bearing directly on the inside end of the main spindle and its outer bearing almost at the end of said main spindle and directly upon it, said main spindle having two separate screw threaded portions intervened by a smooth bearing portion; a combined outer wheel hub, hub-cap and grease cup, mounted upon bearings midway of the super spindle at its inner end and at the outer end provided with roller bearings located in its hub-cap disk, and riding on the bearing portion in between the two screw-threaded portions at extreme outer end of the main spindle, and independent adjusting securing devices on said screw threads for the wheels, one on the inside of the hubcap bearing, and one on the outside thereof.

WILLIS M. MARSH.

REFERENCES CITED

The following references are of record in the file of this patent:

UNITED STATES PATENTS

| Number | Name | Date |
|---|---|---|
| 1,979,598 | Ash | Nov. 6, 1934 |
| 2,082,292 | Kendall | June 1, 1937 |
| 2,482,824 | Alden | Sept. 27, 1949 |

FOREIGN PATENTS

| Number | Country | Date |
|---|---|---|
| 510,663 | Germany | Oct. 22, 1930 |